June 13, 1939.  R. HERRMANN ET AL  2,162,256
CONTROL ARRANGEMENT FOR REFRIGERATORS
Filed May 11, 1936   2 Sheets-Sheet 2
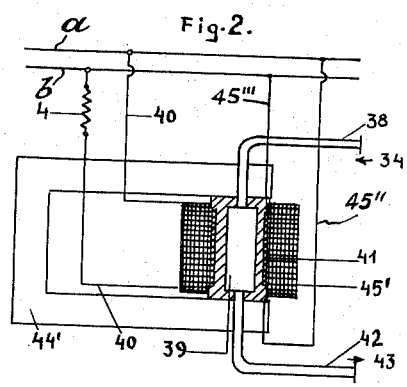
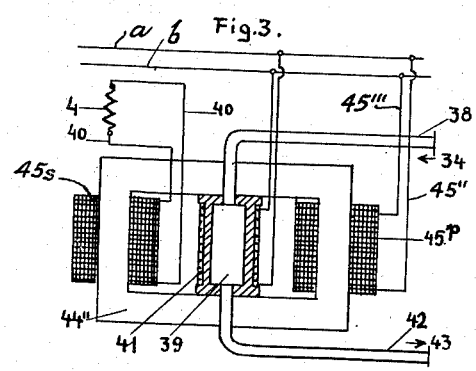
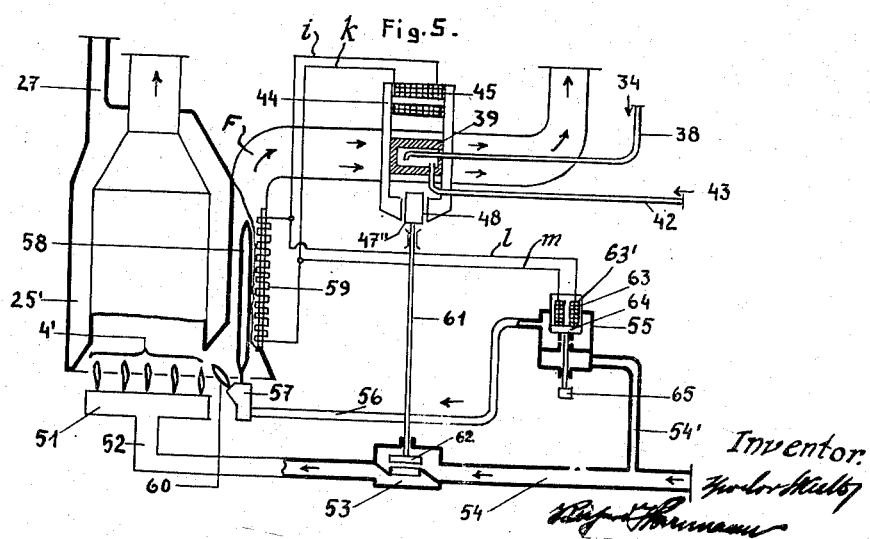

Patented June 13, 1939

2,162,256

UNITED STATES PATENT OFFICE 2,162,256

CONTROL ARRANGEMENT FOR REFRIGERATORS

Richard Herrmann and Theodor Skutta, Vienna, Austria

Application May 11, 1936, Serial No. 79,143
In Austria May 15, 1935

7 Claims. (Cl. 62—5)

This invention relates to refrigerating apparatus of the intermittent absorption class, whose means for heating the generator-absorber is rendered operative or inoperative or regulated within wide limits by only one control means actuated by electric current.

The advantage of a construction according to the invention is the avoidance of complicated switch mechanisms, expansion bodies under high pressure, contacts within the evaporator system and the like. Furthermore it is possible to weld together the parts of the refrigerating apparatus to form a pressure resistant and absolutely gastight appliance.

According to the invention pertaining to the control arrangement for the generator-absorber heating, any electric control member may be used by which the intensity of a working current is varied by the heating or cooling of a single part of the same.

Electromagnetic apparatuses are preferably suitable including a body the permeability of which varies in accordance with its temperature, hereinafter referred to as the "control vessel", said control vessel being permanently heated by any source of heat and intermittently subject to the cooling action of condensed refrigerant and causing the heater of the generator-absorber to be inoperative or operative according to whether it is subject to action of the condensed refrigerant or not.

The term "inoperative" as used herein denotes that the heater is either cut out altogether or that its heating value is reduced to a practically negligible extent.

Various embodiments of the invention are illustrated by way of example in the accompanying drawings, wherein:

Fig. 2 is a diagram of a control in which the control member is a choking coil.

Fig. 3 is a diagram of a control in which the control member is a transformer.

Fig. 5 is a diagram of a control similar to that in Fig. 1 for a gas-fired apparatus.

Figures 1, 4:
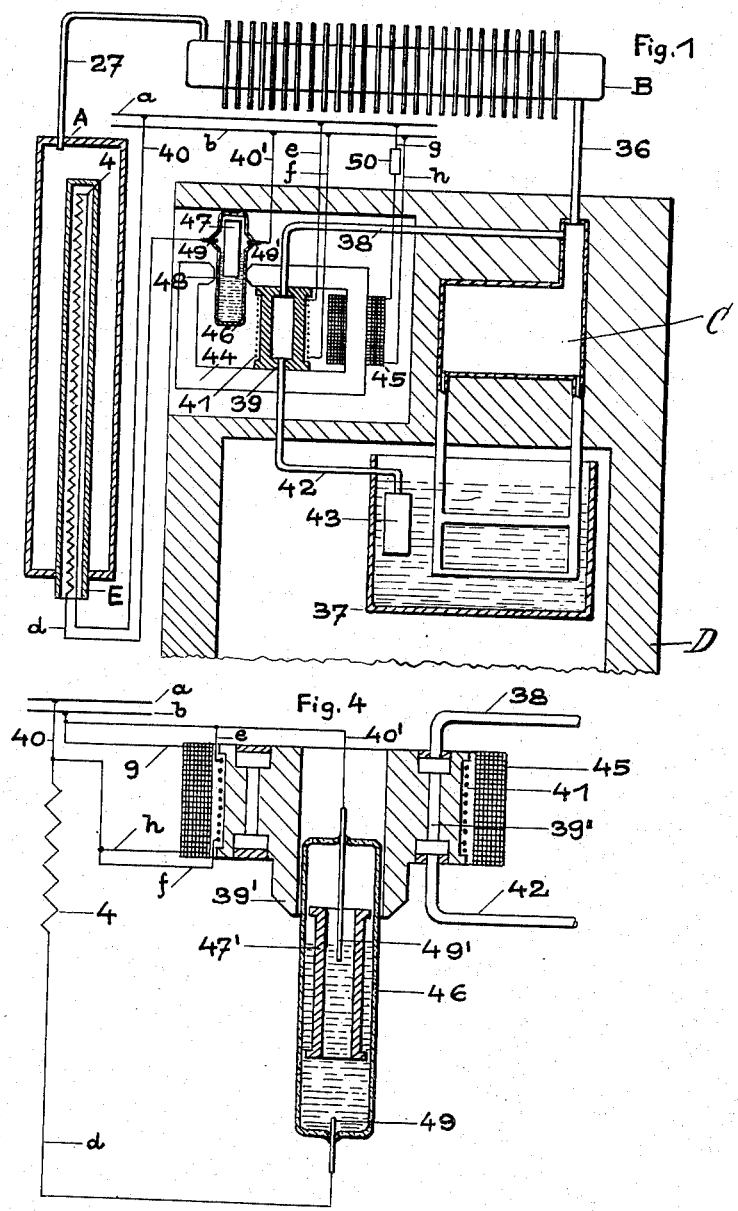
Fig. 1 is a partly sectional elevation of an apparatus with a control member in the shape of a mercury switch in the gap of an electromagnet.
Fig. 4 is a diagram of a control which is similar to the one in Fig. 1 but in which the electromagnet and the control member are combined to a single unit.

Referring now to the drawings and first to Fig. 1 the generator absorber is designated by A, the condenser by B and the receiver-evaporator by C. D is an insulated cabinet in which the lower part of the receiver evaporator C is positioned and immersed in a tank 37 containing cooling brine, 27 is a pipe connecting the generator-absorber A to the condenser B, and 36 is a pipe connecting the condenser B to the receiver-evaporator C. 39 is the control vessel referred to, 38 is a pipe connecting this vessel to a point of the receiver-evaporator C which is just below the highest level of condensate therein, 43 is an auxiliary container in the brine tank 37, and 42 is a pipe connecting the container 43 to the control vessel 39.

The electric equipment of the apparatus will be now described. $a$ and $b$ are the mains of an electric system, 40 is a wire which connects the main $a$ to one terminal of an electric heating resistor 4 in a tube E arranged co-axially in the generator-absorber A, and $d$ is a wire connecting the other terminal of the resistor 4 to one terminal 49 of the control member. This member is here shown as a vessel 46 partly filled with mercury and placed in the air gap 48 of a magnet core 44. An armature 47 of iron floats in the mercury. The other terminal 49' is connected to the main $b$ by wire 40'. An exciting winding 45 is placed on one limb of the magnet core 44 and permanently connected to the supply by wires $g$ and $h$ including an optional ohmic-resistance 50. A heating coil 41 is placed about the control vessel 39 positioned in the magnet core and connected to the supply by wires $e$ and $f$.

As aforesaid, the control vessel 39 is made of a material, e. g., an alloy of 30% nickel and 70% iron, the permeability of which varies inversely proportional with its temperature, the permeability of the vessel being low when heated and high when cooled. Thus, in the arrangement according to the invention, shown in Fig. 1, the permeability of the control vessel is low during the generating period when there is no condensed refrigerant in the vessel to cool it (the condensate in the receiver-evaporator C not having reached the level of the overflow pipe 38), so that the maximum magnetic flux is formed in the gap 48, whereby the armature 47 is drawn into the mercury, the level of the mercury rises and it makes the circuit of the heating resistor 4. When towards the end of the generating period the condensate, after having reached its highest level in the receiver-evaporator C, overflows into the control vessel 39 the same is considerably cooled, whereby its permeability is increased and the magnetic flux is diverted from the gap 48 and passes through the control vessel 39. Thus the armature 47 rises, the level of the mercury drops under the contacts 49, 49', and the circuit of the heating resistor 4 for the generator-absorber is broken.

In normal operation the condensate which has overflown into the control vessel 39 and that remaining in the receiver-evaporator C evaporates during the absorption period which follows the switching off of the resistor 4. After the evaporation a certain interval of time must elapse before the resistor 4 can be switched on again because it takes some time for the heating coil 41 to heat up the control vessel 39 to that temperature at which its permeability becomes sufficiently low to cause the flux to pass through the gap 40. When, however, the load of the refrigerating apparatus is great (i. e., when abnormally great heat absorption is required from the receiver-evaporator C in the cabinet D) it is desirable to cut out or reduce said interval to enable the generating period to follow the preceding absorption period in more rapid succession. For this purpose an auxiliary container 43 is provided in the cabinet D below the lowest level of the condensate in the control vessel 39, the container 43 being connected to vessel 39 by means of a pipe 42. The auxiliary container 43 and the lower part of the receiver-evaporator C are preferably immersed into cooling brine contained in the tank 37. With this arrangement, when the load of the refrigerating apparatus is abnormally high, e. g., when the cabinet D is charged with more provisions as usual, the condensate in the auxiliary container 43 evaporates during the absorption period more rapidly than that in the control vessel 39 because the temperature within the cabinet D is higher than normal. The condensate remaining in the control vessel 39 is now drained through the pipe 42 into the container 43, so that the cooling of the vessel 39 ceases prior to normal, the heater 41 of the control vessel 39 being thus enabled to heat up the latter with the consequent switching on of the resistor 4 prior to the termination of a normal absorption period. By this arrangement the operation of the apparatus is adapted to the degree of cooling required in the cabinet D.

The automatic controls illustrated in Figs. 2 and 3 can operate only with alternating current, but have the advantage that they are without any movable members, such as switch tubes, levers or the like.

Referring to Fig. 2, this control is equipped with a magnet core 44' of U-shape, and the control vessel 39 with its heating coil 41 is disposed between the limbs of the U. The vessel 39 is inclosed by a choking coil 45' which is connected to the mains ab by wires 45" and 45''' in series with the electric heating resistor 4 for the generator-absorber. The switch tube 46, Fig. 1 is omitted and as to the rest the arrangement is the same as in Fig. 1. When there is no condensate in the vessel 39 and it is heated to a temperature above the temperature of the condensed refrigerant the control vessel cannot generate any substantial counter inductive current in the windings 45', so that practically the whole of supply current is utilized for heating the resistor 4. But when the vessel 39 is cooled by the inflowing condensate it generates a substantial counter inductive current in the windings 45' whereby the current supplied to the resistor 4 is reduced to a value negligible in practice. This arrangement, instead of switching the heating resistor 4 on and off, varies the current supplied to it between maximum and minimum values which is in practice equivalent to switching on and off.

Referring to Fig. 3, the magnet core 44" has the form of a closed rectangle and represents a transformer core, one limb of which is surrounded by the primary winding 45p and the parallel limb by the secondary winding 45s. The primary winding 45p is connected to the supply by the wires 45" and 45''', and the secondary winding 45s supplies the heating resistor 4 of the generator-absorber. The control vessel 39 with its heating coil 41 is disposed in the magnet core 44" between the limbs carrying the windings 45p and 45s. When there is no condensate in the vessel 39 and it is heated to a temperature above the temperature of the condensed refrigerant, the maximum magnetic flux passes through the limb carrying the secondary winding 45s and induces the maximum secondary current for the resistor 4 in the generator-absorber. When, however, the control vessel 39 is cooled by the condensate it diverts the magnetic flux from the limb carrying the secondary winding 45s so that the heating resistor 4 will receive but a minimum of current, negligible in practice.

In Figs. 2 and 3 the heating coil 41 for the vessel 39 is connected to the supply. If the coil 41 were connected to the terminals of the heating resistor 4, instead of the supply, the current supplied to heating coil 41 during the absorption period, i. e., when the vessel 39 is cooled, would be reduced, because the secondary current would then be almost nil, resulting in a saving of cooling condensate. Also, the control vessel 39 may be constructed without any mechanical subdivisions, so that considerably eddy currents may be generated therein, resulting in the generation of Joule-heat, whereby the amount of heat to be supplied by the heating coil 41 is reduced.

Referring to Fig. 4, the electromagnet and the control vessel are combined to form a single unit 39' with a central bore in which the mercury switch tube 46 is disposed. This control vessel 39' has an internal annular passage 39" connected to the pipes 38 and 42 for receiving the condensate. The exciting coil 45 and the heating coil 41 surround the vessel 39' and are connected to the mains ab as described with reference to Fig. 1. One terminal of the heating resistor 4 of the generator-absorber is permanently connected by means of the contact 49 to the mercury in the switch tube 46 through the wire d and the mercury makes contact with the contact 49' when the armature 47' is in its position of rest, i. e. when the vessel 39' is not cooled and consequently not magnetized. The heating resistor 4 is then switched on. When the condensate enters the internal annular passage 39" of the vessel 39' it becomes magnetizable, attracts the armature 47', the level of the mercury drops and its contact with contact 49' is broken with the result the heating resistor 4 is switched off.

Fig. 5 shows the control suitable for a refrigerating apparatus wherein gas heating is employed. The generator-absorber is heated by a circulating liquid, such as for example glycol, which same becomes heated in an annular space 25' by means of a principal gas burner 51 and which passes to the generator-absorber through a conduit 27. The burner 51 is connected by a pipe 52 to a valve 53 and through this valve to a gas main 54. From the latter a pilot burner conduit 54' branches to a valve 55 which is also connected with an electromagnet, said valve 55 supplying a pilot burner 57 through a pipe 56. The pilot burner is so constructed that it supplies on the one hand, a heating flame 58 for a thermo-battery 59, and on the other hand, a pilot flame 60 for the flames 4' of the principal burner 51.

A magnet core 44 of soft iron and a control vessel 39 are arranged as described with reference to Fig. 1, and the vessel 39 is positioned in the flue F of the flame 58 where it is heated. The armature 47" of the electromagnet is connected to the main valve 62 by a rod 61. The pilot valve is provided with a cylindrical magnet 63, said magnet holding the valve member 64 in raised position and thereby keeping the conduit of the flame 58, 60 open as long as heat is supplied to the thermo battery. The terminals of the battery 59 are connected with the exciting winding 45 of the magnet core 44 by the wires $i$ and $k$ and with the exciting winding 63' of the electromagnetic valve 55 by the wires $l$ and $m$. The valve member 64 may be lifted off the valve seating by a suitable handle 65. In operation, the pilot valve 55 is first opened by hand with the aid of a handle 65 and the pilot flames 58 and 60 are ignited. Current is at once generated by the thermo-battery 59 and supplied to the windings 63' of the magnet 63, whereby the magnet is excited and will retain the valve member 64 in open position, into which it has been raised by means of the handle 65, thus ensuring the continued flow of gas to the pilot flames 58 and 60. Current is also supplied to the windings 45 and while this current reaches its maximum value the control vessel 39" is also heated up by the flue gases so that it becomes non-magnetic. The major portion of the flux in the core 44 thus flows across the gap 48, so that the armature 47" is raised and the valve member 62 of the principal burner 51 is opened and gas is supplied to the burner 51 whereby the heating of the circulating liquid in the space 25' sets in. When the condensate enters the vessel 39" and same becomes sufficiently cooled, it becomes magnetic and diverts the flux from the gap 48, with the result that the armature 47" drops and the gas is cut off from the burner 51, so that the heating of the generator absorber is discontinued. If for any reason, e. g., owing to a fault in the system, the pilot flames are also extinguished, both valves are closed, so that unignited gas cannot escape. This renders the operation of the device perfectly safe.

The two magnets, as also the two valves may be respectively combined together.

What we claim is:

1. In a refrigerating apparatus of the intermittent absorption class, in combination with a generator-absorber, a condenser, a receiver-evaporator, the required communications between them, means for heating the generator-absorber, an automatic control for switching on or off or for regulating the heating of the generator-absorber including a control vessel, a pipe connecting the vessel to a point of the receiver-evaporator which is just below the highest level of condensate in the receiver-evaporator, means for continuously heating the control vessel and means influenced by the temperature in the control vessel, for operating the control member.

2. In a refrigerating apparatus of the intermittent absorption class, in combination with a generator-absorber, a condenser, a receiver-evaporator, the required communications between them, means for heating the generator-absorber, a cabinet surrounding the receiver-evaporator, an automatic control for switching on or off and for regulating the heating of the generator-absorber including a control vessel, a pipe connecting the vessel to a point of the receiver-evaporator which is just below the highest level of condensate in the receiver-evaporator, means for uninterrupted heating the control vessel, means influenced by the temperature in the control vessel, for operating the control, an auxiliary container in the cabinet and a pipe connecting the container to the control vessel.

3. In a refrigerating apparatus of the intermittent absorption class, in combination with a generator-absorber, a condenser, a receiver-evaporator, the required communications between them, means for heating the generator-absorber, a cabinet surrounding the receiver-evaporator, an automatic control for switching on or off and for regulating the heating of the generator-absorber including a control vessel, a pipe connecting the vessel to a point of the receiver-evaporator which is just below the highest level of condensate in the receiver-evaporator, means for continuously heating the control vessel, means influenced by the temperature in the control vessel, for operating the control, an auxiliary container in the cabinet, a pipe connecting the container to the control vessel and a tank filled with cooling brine in the cabinet arranged to receive the container and the lower part of the receiver-evaporator.

4. In a refrigerating apparatus of the intermittent absorption class, in combination with a generator-absorber, a condenser, a receiver-evaporator, the required communications between them, a supply of electric energy, an electric heater for the generator-absorber, a circuit connecting the heater to the supply, a control member for making and breaking the heater circuit, an electromagnet for operating the control member, a control vessel connected to the electromagnet and made of a material whose permeability is inversely proportional to temperature, a permanently working electric heater for the vessel connected to the supply, and a pipe connecting the control vessel to a point of the receiver-evaporator which is just below the highest level of condensate in the receiver-evaporator.

5. In a refrigerating apparatus of the intermittent absorption class, in combination with a generator-absorber, a condenser, a receiver-evaporator, the required communications between them, a supply of electric energy, an electric heater for the generator-absorber, a circuit connecting the heater to the supply, a choking coil in the said circuit, a control vessel inclosed by the windings of the choking coil and made of a material whose permeability is inversely proportional to temperature, a permanent-working electric heater for the vessel connected to the supply, and a pipe connecting the control vessel to a point of the receiver-evaporator which is just below the highest level of condensate in the receiver-evaporator.

6. In a refrigerating apparatus of the intermittent absorption class, in combination with a generator-absorber, a condenser, a receiver-evaporator, the required communications between them, a supply of electric energy, an electric heater for the generator-absorber, a transformer, the primary windings of said transformer connected to the supply, the secondary windings connected to the heater of the generator-absorber, a control vessel in the magnet-core of the transformer and made of a material whose permeability is inversely proportional to temperature, a permanently working electric heater for the vessel connected to the supply, a pipe connecting the control vessel to a point of the receiver-evaporator which is just below the highest level of condensate in the receiver-evaporator.

7. In a refrigerating apparatus of the intermittent absorption class, in combination with a generator-absorber, a condenser, a receiver-evaporator, the required communications between them, a principal gas burner for heating the generator-absorber, a main for supplying gas to the principal burner, a valve in the main, a pilot burner, a branch pipe connected to the main at one end ahead of the valve, and to the pilot at its other end, a pilot valve in the branch pipe, a thermoelectric battery heated by the pilot, electromagnets in the circuit of the battery for operating the valves, a control vessel positioned in the way of the waste gas from the pilot, connected to the electromagnet for operating the main valve, and made of a material whose permeability is inversely proportional to temperature, and a pipe connecting the control vessel to a point of the receiver-evaporator which is just below the highest level of condensate in the receiver-evaporator.

RICHARD HERRMANN.
THEODOR SKUTTA.